United States Patent [19]
Oh

[11] Patent Number: 5,941,346
[45] Date of Patent: Aug. 24, 1999

[54] LUBRICANT STRUCTURE OF CLOSED-TYPE TRANSMISSION COMPRESSOR

[75] Inventor: Won Sik Oh, Seoul, Rep. of Korea

[73] Assignee: LG Electronics Inc., Seoul, Rep. of Korea

[21] Appl. No.: 08/905,944

[22] Filed: Aug. 5, 1997

[30] Foreign Application Priority Data

Aug. 5, 1996 [KR] Rep. of Korea ................. 96-23714
Aug. 5, 1996 [KR] Rep. of Korea ................. 96-32580

[51] Int. Cl.⁶ .................................................. F01M 1/00
[52] U.S. Cl. ........................... 184/6.16; 184/32; 418/63
[58] Field of Search ................................ 184/6.16, 6.6, 184/6.8, 27.4, 32; 418/63

[56] References Cited

U.S. PATENT DOCUMENTS

| | | | |
|---|---|---|---|
| 1,470,769 | 10/1923 | Shaw | 184/6.6 |
| 4,543,047 | 9/1985 | Hasegawa | 418/63 |
| 4,544,338 | 10/1985 | Takebayashi et al. | 418/63 |
| 5,616,018 | 4/1997 | Ma | 418/63 |
| 5,662,023 | 9/1997 | Carson et al. | 92/59 |
| 5,795,140 | 8/1998 | Jin | 417/372 |

*Primary Examiner*—John A. Jeffery
*Assistant Examiner*—David Fenstermacher

[57] ABSTRACT

A closed-type transmission compressor comprises an upper shell having a compressing unit and a lower shell having a transmission unit. The transmission unit includes a stator which generates magnetic power, a rotor rotated by the magnetic power of the stator, and a crankshaft rotated by rotation of the rotor. The compressing unit includes a slider changing rotatory movement of the crankshaft into linear movement, a piston attached to the slider and reciprocating in a cylinder, a head cover covering the cylinder, an inlet valve between a head and a head cover which permits intake of a refrigerant gas, an outlet valve between the head and the head cover which permits exhaust of the refrigerant gas, a propeller conveying oil in the lower shell into the crankshaft, and a screw-shaped oil path groove formed in the inside of crankshaft along which the oil is flowed.

5 Claims, 5 Drawing Sheets

LUBRICANT STRUCTURE OF CLOSED-TYPE TRANSMISSION COMPRESSOR

BACKGROUND OF THE INVENTION

The present invention relates to a closed-type transmission compressor, more particularly, to a lubricant structure in a closed-type transmission compressor which provide enough lubricating oil to a part which requires lubricating oil (hereinafter referred as the lubricating part).

A conventional closed-type transmission compressor includes, as shown in FIG. 1, an upper shell 1 having a compressing unit and a lower shell 2 having a transmission unit, in which the transmission device part includes a stator 4 attached to a frame 3 by using bolts for providing magnetic power, a rotor 5 rotating by the magnetic power of the stator 4, and a crankshaft 6 rotating by rotation of the rotor 5. The compressing unit includes a slider 7 changing the rotatory movement of the crankshaft 6 into linear movement, a piston 8 attached to the slider 7 and reciprocating in a cylinder 9, a head cover 10 covering the cylinder 9, an inlet valve 11 between head 10 and the head cover 10 which permits intake of a refrigerant gas, an outlet valve 12 between the head 10 and the head cover 13 which permits exhaust of the refrigerant gas, and a propeller 14 dispersing oil 15 in the lower shell 2 into the crankshaft 6.

By applying electricity to the compressor, the rotor 5 is rotated by an induced current occurring between the stator 4 and rotor 5, therefore the crankshaft 6 attached to the rotor 5 is rotated. The rotatory movement of the crankshaft 6 is changed into linear movement by the slider 7, whereby the piston 8 reciprocates in the cylinder 9.

On the other hand, propeller 14 provided on a lower side of the crankshaft 6 sucks oil 15 into the crankshaft 6, and the oil 15 is also dispersed in the upper shell 2, especially on the piston 8 and cylinder 9.

In the prior art, however, when a compressor, such as a variable speed compressor, is driven in low speed, it is impossible to provide sufficient lubricating oil to the lubricating part because the rotating force of the crankshaft decreases at low speed.

SUMMARY OF THE INVENTION

It is an object of the present invention to provide a closed-type transmission compressor which is capable of providing the lubricating oil to the lubricating part at low operating speeds.

In order to achieve the above-mentioned object, a closed-type transmission compressor according to a first embodiment of the present invention comprises an upper shell having a compressing unit and a lower shell having a transmission unit, in which the transmission unit includes a stator attached to a frame by bolts and generating magnetic power, a rotor rotating by the magnetic power of the stator, and a crankshaft rotating by rotation of the rotor. The compressing unit includes a slider changing rotatory movement of the crankshaft into linear movement, a piston attached to the slider and reciprocating in a cylinder, a head cover covering the cylinder, an inlet valve between a head and the head cover which permits intake of a refrigerant gas, an outlet valve between the head and the head cover which permits exhaust of the refrigerant gas, a propeller providing an oil in the lower shell to the crankshaft, and a screw-shaped oil path groove formed in the inside of crankshaft in which the oil flows along the screw-shaped oil path groove.

Further, a closed-type transmission compressor according to a second embodiment of the present invention comprises an oil pump provided on an upper side of the crankshaft, an oil inlet pipe for supplying oil from the oil pump, and an oil outlet pipe which disperses the oil sucked through the oil inlet pipe to the piston or bearing parts requiring oil.

DETAILED DESCRIPTION OF THE INVENTION

Preferred embodiments of the present invention are described in detail hereinafter with reference to the accompanying drawings.

Figure 1:
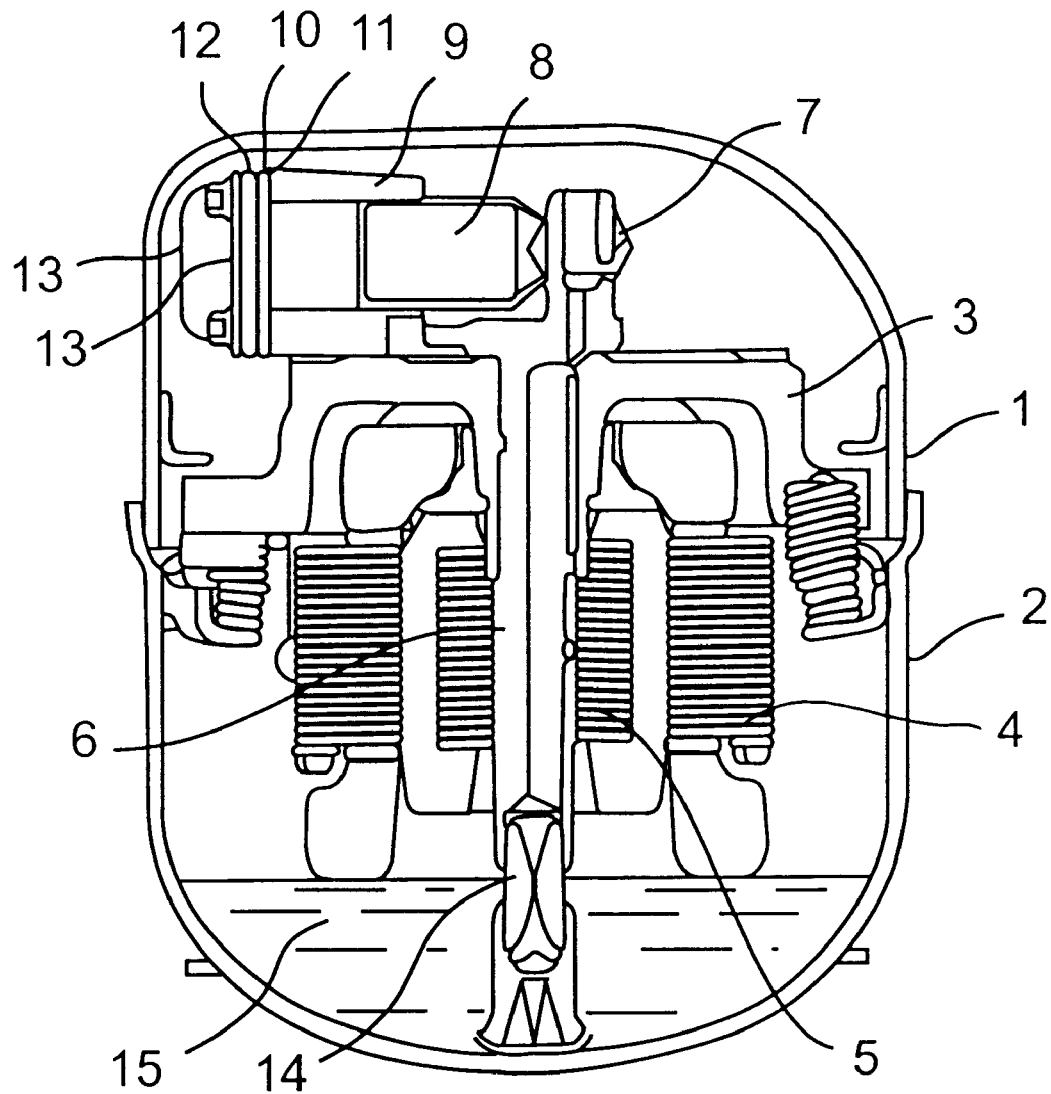
FIG. 1 is a longitudinal sectional view of a traditional closed-type transmission compressor.
Figure 2:
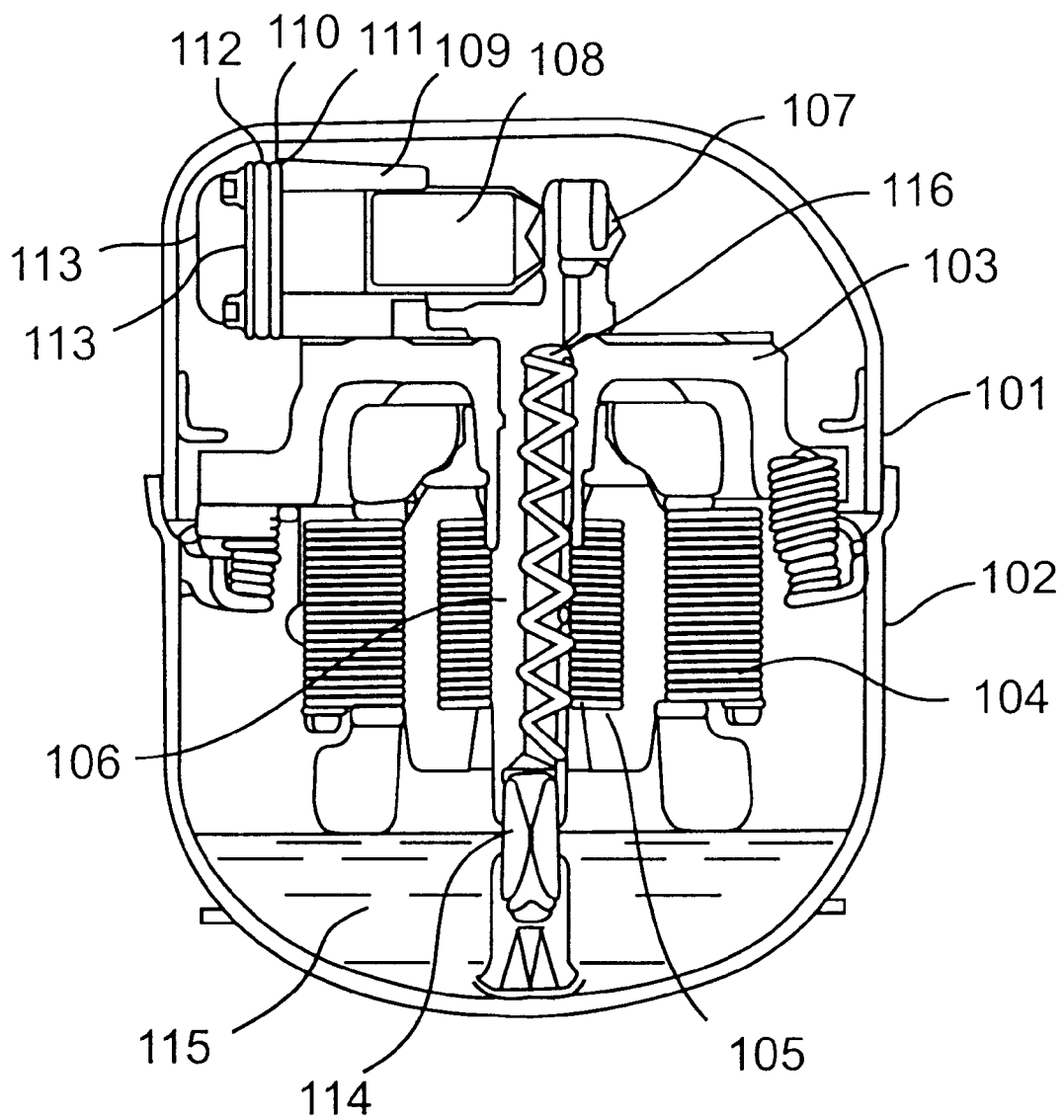
FIG. 2 is a longitudinal sectional view of a closed-type transmission compressor according to a first embodiment of the present invention.

Referring to FIG. 2, a closed-type transmission compressor according to a first embodiment of the present invention comprises an upper shell 101 having a compressing unit and a lower shell 102 having a transmission unit. Lower shell 102 includes a stator 4 attached to a frame using bolts and providing magnetic power, a rotor 105 rotating in accordance with the magnetic power of the stator 104 and a crankshaft 106 rotating by rotation of the rotor 5. The compressing unit includes a slider 107 changing rotatory movement of the crankshaft 106 into linear movement, a piston 108 attached to the slider 109 and reciprocating in a cylinder 109, a head cover 113 covering the cylinder 109, an inlet valve 111 between a head 110 and the head cover 113 which permits intake of a refrigerant gas, an outlet valve 112 between the head 110 and the head cover 113 which permits exhaust of the refrigerant gas, a propeller 114 conveying oil 115 in the lower shell 102 into the crankshaft 106, and a screw-shaped oil path groove 116 formed inside of the crankshaft 106 in which the oil 115 flows.

When electric power is applied to the compressor, the rotor 105 rotates due to the induced current between the stator 104 and rotor 105, whereby the crankshaft 106 attached to the rotor 105 is rotated. The rotatory movement of the crankshaft 106 is changed into linear movement by the slider 107, whereby the piston 108 reciprocates in the cylinder 109.

On the other hand, the propeller 114 provided on a lower side of the crankshaft 106 introduces oil 115 into the crankshaft 106. The introduced oil is dispersed via the screw-shaped oil path groove 116 into the upper shell 102, especially over the piston 108 and cylinder 109.

Figure 3A:
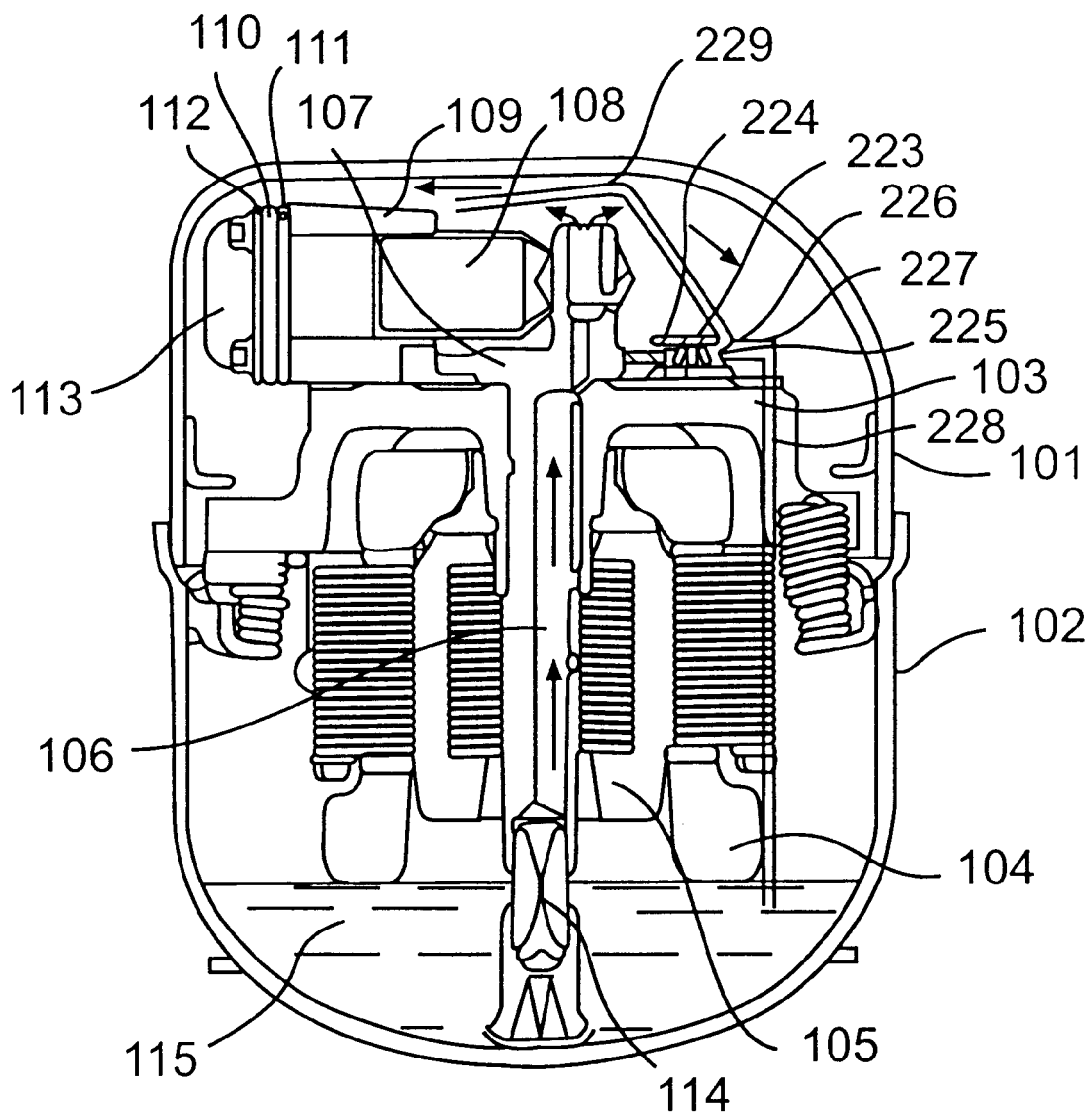
FIGS. 3a-b are longitudinal sections of two closed-type transmission compressors according to a second embodiment of the present invention.
Figure 3B:
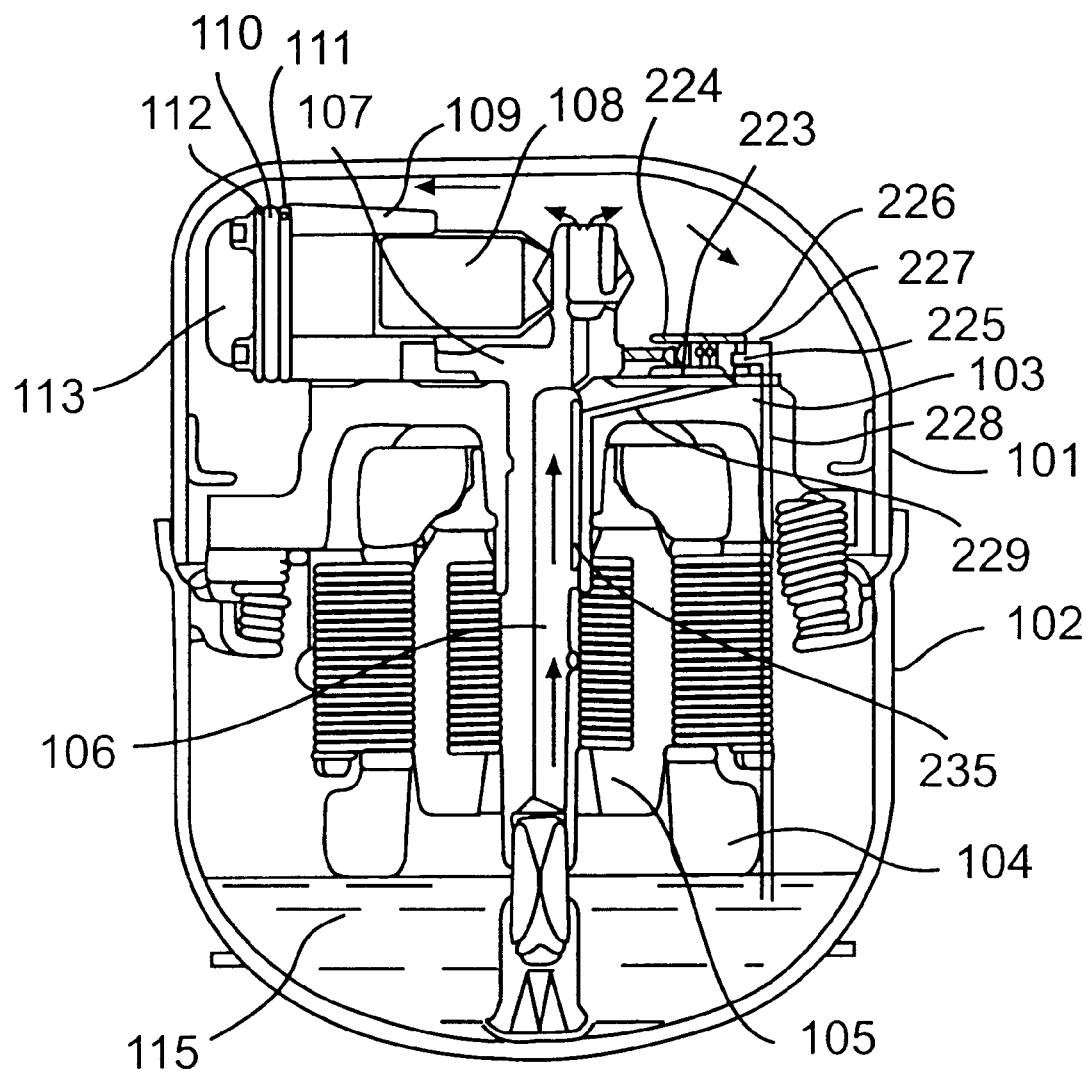

As shown in FIGS. 3a-b, a closed-type transmission compressor according to a second embodiment of the present invention comprises the upper shell 101 having the compressing unit and the lower shell 102 having the transmission unit which includes the stator 104 attached to the frame by bolts. The stator 104 introduces magnetic power, the rotor 105 rotates by the magnetic power of the stator 104, and the crankshaft 106 rotations by rotation of the rotor 105. The compression device part includes the slider 107 changing the rotatory movement of the crankshaft 106 into linear movement, the piston 108 attached to the slider 109 and reciprocating in the cylinder 109, the head cover 113 covering the cylinder 109, the inlet valve 111 between the head 110 and the head cover 113 permitting intake of the refrigerant gas, the outlet valve 112 between the head 110 and the head cover 113 permitting exhaust of the refrigerant gas. A propeller 114 conveys oil 115 in the lower shell 102 into the crankshaft 106. An oil pump piston 223 and cylinder 224 are connected with an eccentric upper side part of the crankshaft 106. An oil inlet valve 225, valve sheet 226, and an oil inlet head cover 227 are provided on the oil pump cylinder 224. An oil inlet pipe 228 connects the oil 115 with the oil inlet head cover 227, and an oil outlet pipe 229 which disperses the oil sucked through the oil inlet pipe 228 to the piston 108 and/or bearing part 235.

Figure 4:
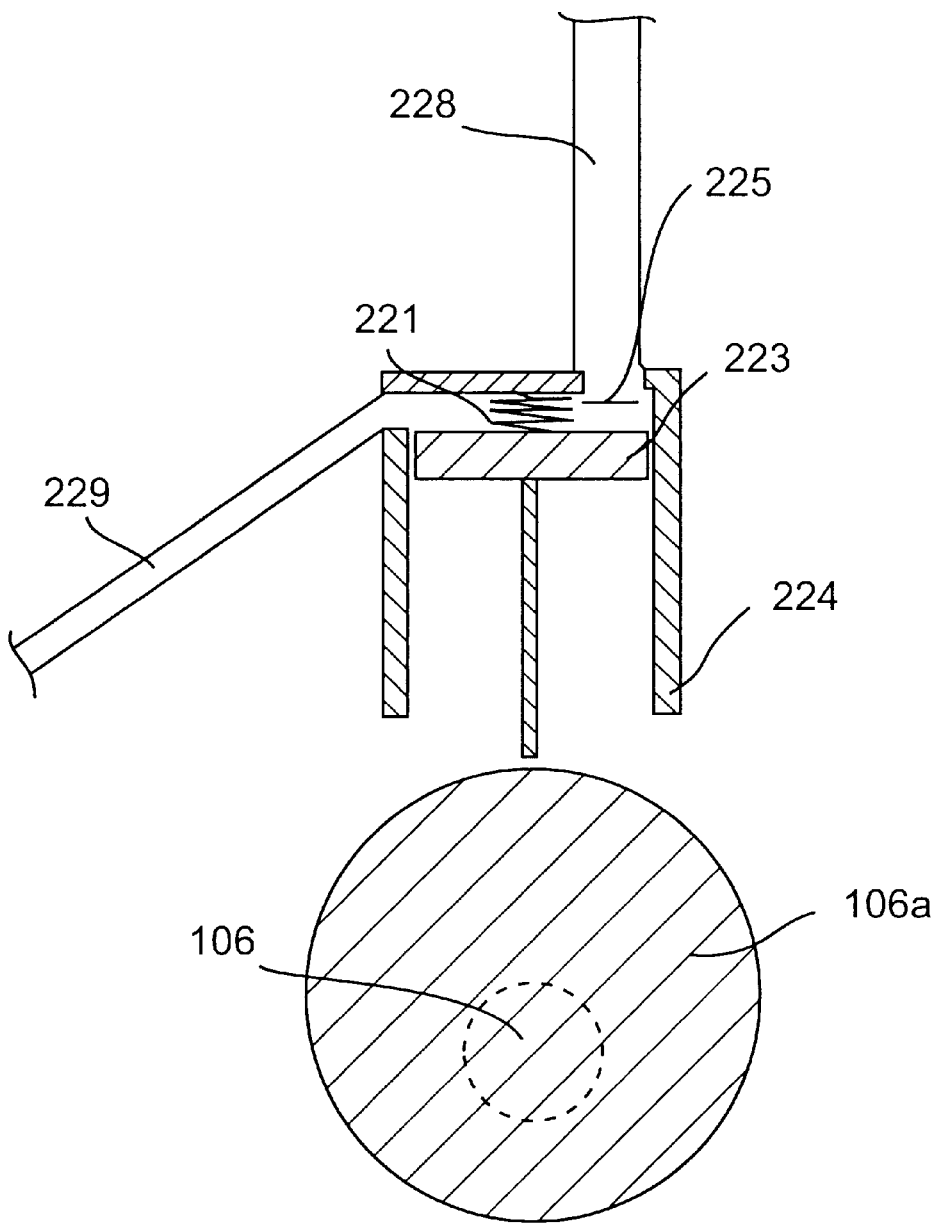
FIG. 4 is a partially enlarged sectional view of the oil pump used in the second embodiment of the present invention.

FIG. 4 is a partially enlarged sectional view of the oil pump used in the second embodiment of the present invention. When the eccentric part 106a of the crankshaft 106 is rotated, the oil pump piston 223 moves to a bottom dead point, at this time a spring 221 helps bias the oil pump piston 223 to move to the bottom dead point, whereby the oil inlet valve 225 is opened. The oil 115 in the lower shell 102 then flows via oil inlet pipe 228 into the oil pump cylinder 224 because of a pressure difference. In accordance with movement of the eccentric part 106a, the oil pump piston subsequently moves to a top dead point, at which point flowed oil in oil pump cylinder 224 is dispersed over the piston (in case of FIG. 3a) or bearing part (in case of FIG. 3b) through the outlet pipe 229 (because oil inlet valve 225 is then forced closed).

In the present invention, it is therefore possible to provide enough lubricating oil to a lubricating part of the compressor during low speed operation, by providing a screw-shaped oil path groove within the crankshaft or providing an oil pump which is driven by an eccentric part of the crankshaft.

It should also be understood that the foregoing relates to only a preferred embodiment of the invention, and that it is intended to cover all changes and modifications of the example of the invention herein chosen for the purposes of the disclosure, which do not constitute from the spirit and scope of the invention.

What is claimed is:

1. A lubricating mechanism, comprising:

a rotatably mounted crankshaft having a cam member mounted thereon eccentric to said crankshaft;

an oil cylinder having a piston slidably mounted therein and having a pump space defined therein by an interior of said oil cylinder and said piston, wherein said cam member is arranged so as to cyclically displace said piston in correspondence with rotation of said crankshaft such that a size of the pump space varies accordingly;

an oil inlet pipe constructed and arranged to selectively feed oil into said pump space; and an oil outlet pipe from which oil in said pump space is dispersed when pumped therefrom by said piston.

2. The mechanism according to claim 1, further comprising a resilient member constructed and arranged to bias said piston in a direction opposite to the displacement of said piston by said cam member.

3. The mechanism according to claim 2, wherein said resilient member is a spring.

4. The mechanism according to claim 1, further comprising a valve located between said oil inlet pipe and said oil cylinder.

5. The mechanism according to claim 1, wherein said crankshaft is connected to a motor in a compressor, wherein oil dispersed from said oil outlet pipe is lubricatingly dispersed over the compressor.

\* \* \* \* \*